United States Patent [19]

Bergishagen et al.

[11] Patent Number: 5,443,748
[45] Date of Patent: Aug. 22, 1995

[54] PAINT CLEANING COMPOSITION AND METHOD

[75] Inventors: Finn Bergishagen, West Bloomfield; Jay W. Pease, Grosse Pointe Park, both of Mich.

[73] Assignee: Product-Sol, Inc., Birmingham, Mich.

[21] Appl. No.: 41,907

[22] Filed: Apr. 2, 1993

Related U.S. Application Data

[63] Continuation of Ser. No. 755,675, Sep. 6, 1991, abandoned.

[51] Int. Cl.⁶ .......................... C09D 9/00; C11D 7/50
[52] U.S. Cl. .................................. 252/162; 252/170; 252/DIG. 8
[58] Field of Search .................. 252/162, 170, DIG. 8

[56] References Cited

U.S. PATENT DOCUMENTS

| | | | |
|---|---|---|---|
| 4,434,075 | 2/1984 | Mardis et al. | 252/DIG. 8 X |
| 4,434,076 | 2/1984 | Mardis et al. | 252/DIG. 8 X |
| 4,517,112 | 5/1985 | Mardis et al. | 252/DIG. 8 X |
| 4,999,126 | 3/1991 | Meade | 252/DIG. 8 X |
| 5,011,621 | 4/1991 | Sullivan | 252/162 |
| 5,015,410 | 5/1991 | Sullivan | 252/162 X |
| 5,098,591 | 3/1992 | Stevens | 252/170 X |

*Primary Examiner*—P. Achutamurthy
*Attorney, Agent, or Firm*—Harness, Dickey & Pierce

[57] ABSTRACT

A paint cleaning material has one or more liquid solvent vehicles with organic rheological materials dispersed therein. The composition is used to clean paint covered surfaces of paint line tubes, paint line fixtures, and paint booths commonly used in automotive and non-automotive industries. Cleaning is accomplished by the composition coagulating and precipitating the paint residues in the paint line tubes, fixtures and paint booths during the cleaning cycle.

4 Claims, No Drawings

PAINT CLEANING COMPOSITION AND METHOD

This is a continuation of U.S. patent application Ser. No. 755,675, filed Sep. 6, 1991 and now abandoned.

BACKGROUND OF THE INVENTION

1. Technical Field

This invention relates to compositions and methods for cleaning paint residues or deposits of paint commonly found in the interior walls of paint lines, tanks, and the like; and exterior surfaces such as the walls of paint booths, fixtures, and the like. More specifically, the present invention relates to a process and composition for cleaning interior and exterior surfaces of encrusted paint utilizing specific rheological agents or additives.

2. Discussion

Presently, the paint systems used in mass assembly operations such as the automotive and appliance industries generally rely on a central supply depot from which paint is passed through complex sets of paint lines to stationary paint stations located within an enclosed paint booth. The parts are painted as they pass through paint booths on a moving conveyor. Because the system uses several tanks, valves, pumps, bypass lines and the like, a variety of paints can be delivered to a given paint station over common lines. Such a system, however, requires constant maintenance and housekeeping in order to maintain an efficient operation. Without this maintenance, the central supply depot becomes coated and contaminated with a variety of paints, the paint lines become clogged with encrustation of paint, the paint stations and spray nozzles become inoperative and the paint booths become contaminated from overspray during the paint cycle.

One approach to cleaning paint systems, and in particular the paint delivery lines used within the paint system, recycles a variety of solvents and solvent additives to clean the system. The solvents used may be organic or aqueous-based, although organic-based solvents are generally preferred for most present day systems. The solvent additives used may include detergents, surfactants, sand, mica or even other solvents, in the case of organic-based solvents; or alkaline or acidic additives in the case of aqueous-based solvents.

A more recent approach is to use inert particulate organic polymeric materials dispersed in an organic solvent as disclosed in U.S. Pat. No. 4,968,447, to Dixon, et al. This system and other similar systems rely on the abrasive action of the particulates to loosen encrusted deposits from the paint lines during the cleaning cycle. However, such use of inert particulate organic polymeric materials has several disadvantages. Build-up occurs in the restricted areas of paint lines such as valves, drop lines, bypass lines, etc. which, once formed is difficult to break up and remove. This difficulty in removing all traces of the particulates necessitates the use of a greater number of rinse cycles, and sometimes the use of a paint compatible resin rinse, followed by a paint compatible solvent rinse, in order to ensure removal of all the particulates.

In practice, it is difficult to remove all of these particulates in some restricted areas and therefore the system must be dismantled in order to dislodge the obstruction. Also, although sophisticated filtration systems are used in these paint systems, even the slightest flaw in the filtering system will cause paint defects if any of these inert organic particulates are not retained within the filters.

Another disadvantage of inert organic particulate materials is their tendency to build up on the external walls of vessels and fixtures. This results from the evaporation of the organic cleaning solvents depositing the inert organic polymeric particulates as a powdery mass on the surface. This increases the housekeeping problem since any powdered substance easily becomes airborne or is transferred by clinging to workers' shoes or clothing. In some cases, where the cleaning solvent is not sufficient to remove all of the paint residue, the paint residue becomes even more encrusted due to the additional inert organic particulates when the cleaning solvent is allowed to evaporate. Obviously, cleaning solvents using these types of inert organic polymeric particulates are a housekeeping problem and a potential source of contamination to the paint system.

SUMMARY OF THE INVENTION

The present invention overcomes the shortcomings of the relevant art as it provides a simple composition eliminating inert particulate additives. In the case of cleaning the walls of interior paint line systems, it provides the cleaning composition with a rheological agent or additive. The rheological agent or additive is both insoluble and evenly dispersed in the preferred solvent carrier or vehicle at the normal cleaning or stripping cycle temperatures. The rheological agent or additive becomes soluble during the rinse cycle by either increasing the temperature of the vehicle or adding one or more solvents to the vehicle. This system not only eliminates the insoluble particulate buildup in restricted areas in paint lines and on external surfaces experienced with the relevant art, it also eliminates the housekeeping and contamination problems experienced with the relevant art. In addition to providing the equivalent of the action found in the relevant art during the stripping cycle and the subsequent benefit of the solubility of the rheological agents or additives in the solubilizing or rinse cycle, these rheological agents or additives are also generally regarded as paint compatible and are not considered as a potential paint contamination problem. Also, since there are no insoluble particulates to flush from the system, the cleaning cycle time is reduced, resulting in increases efficiency and cost savings.

In the case of cleaning the walls of exterior surfaces such as paint booth walls and fixtures commonly associated with paint booths, the present invention also overcomes the shortcomings of the relevant art by providing the cleaning composition with a rheological additive that coagulates the paint on the surface being cleaned causing the coagulated paint to run down from a vertical surface; or to curdle and puddle on a horizontal surface so that the surface is readily cleaned by a rinsing agent. The term "killed" the paint is sometimes used to define this condition of curdled or puddled paint. Although it is not necessary, it is sometimes beneficial to add a detergent or surfactant to the vehicle to facilitate the cleaning of the surface during the rinse cycle.

The paint cleaning compositions of the present invention include a non-abrasive organic rheological material which forms an insoluble particulate gel structure in the carrier or vehicle. The rheological material facilitates the removal of encrusted paint in a similar manner as compositions containing abrasive organic or inorganic materials, such as polypropylene particulates and the like. The particulates utilized in this invention do not rely on density to remain dispersed and suspended; rather, the characteristics of the dispersed rheological agents cause them to remain suspended in the carrier or vehicle. Although these rheological materials are capable of dispersing and suspending other particulates with densities greater than the carrier or vehicle, no particular advantage is gained in cleaning efficiency. The particle size is not a factor, but it has been noted that these non-abrasive organic rheological additives are generally less than 200 microns.

Due to the minimal increase in viscosity of the cleaning composition utilizing these materials, cleaning efficiency is kept at its maximum. Disposal or recycling is not a factor since the total composition is readily incinerated. In the event recycling is preferred to incineration, the "killed" paint is readily filtered from the solvent. These and other advantages of the present invention will be apparent from the description and claims which follow.

DETAILED DESCRIPTION OF THE INVENTION

The composition of the present invention includes in its simplest form a non-abrasive rheological material and a solvent carrier or vehicle. The rheological material is heated in a solvent vehicle to become solubilized within the solvent vehicle and upon cooling, precipitated in the solvent vehicle to form an insoluble particulate gel structure. When introduced into a paint system, the insoluble particulate gel structure coagulates, removes and suspends encrusted paint. The insoluble particulate gel structure is resolubilized and removed from the paint system during the rinse cycle.

A typical rheological material useful for this invention is selected from the group consisting of modified starch including cross-linked and converted starches and dextrins and their derivatives; cellulose derivatives including methyl, hydroxypropyl methyl-cellulose, hydroxyethyl cellulose, and carboxymethylcellulose; polyacrylamide; ethylene oxide polymers; gums including agar, arabic, manila, guar, etc.; poly(acrylic acid) and its homologs; and polyvinylpyrrolidone, organic derivatives of castor oil and combinations thereof. Preferred rheological materials are modified starch derivatives, cellulose derivatives, ethylene oxide derivatives, and organic derivatives of castor oil and combinations thereof. The most preferred rheological materials are organic derivatives of modified starch and organic derivatives of castor oil and combinations thereof.

Although the present invention is not limited to any particular size of the rheological materials, which is somewhat dependent on the choice of solvent or combination of solvents during the stripping stage of the cleaning cycle, particle sizes are generally between 5 and 200 microns, preferably less than 150 microns, and most preferred at about 10 to 50 microns.

The composition is effective for rheological material portions of about 0.1 to 20% by weight. In a preferred embodiment, the composition contains about 0.5 to about 7.0% rheological material by weight. Most preferably, the composition contains from about 1.0 to 4.0% rheological material by weight.

One example of a typical rheological material is an organic derivative of castor oil available from Mooney Chemicals, Inc., and supplied under the trade name of "Viscotrol". This material is insoluble in an aromatic solvent such as xylene at room temperature.

The solvent carrier or vehicle comprising the remainder of the composition may be an organic or a combination of organic solvents, or a combination of organic solvents in an aqueous base depending upon the particular cleaning task. Among the organic solvent carriers or vehicles, which may be used singularly or in combination, are solvents such as aliphatic and aromatic hydrocarbons, lactones, pyrrolidones, terpenes, alcohols, organic acids, amines, amides, ketones, aldehydes, esters, halogenated solvents, ethers, glycols, glycol ethers and the like and mixtures thereof. The preferred organic solvent carriers or vehicles are aliphatic and aromatic hydrocarbons, lactones, esters, ketones, alcohols, and glycol ethers. Most preferred are the organic solvent carriers aromatic hydrocarbons, lactones, esters, ketones, alcohols, and glycol ethers.

Among the aqueous-based solvent vehicles which may be used in combination with the organic solvent vehicles are aqueous-based solvent vehicles which may be either acidic or alkaline and include detergents, surfactants or similar materials necessary to blend water and other aqueous-based materials with the organic solvents. The more preferred aqueous-based materials are water, alcohol, glycol ethers, N-methyl-2-pyrrolidone, acetic acid and monoethanolamine. Most preferred are water, alcohol, glycol ethers and N-methyl-2-pyrrolidone. The basic requirement of the vehicle is that it be inert to the rheological material during the cleaning or stripping cycle whether or not it is for cleaning internal paint lines or external surfaces.

Upon removal of the composition and paint, the paint system is flushed with a rinsing agent such as toluene, xylene, an aromatic hydrocarbon solvent with a flash point between 80° F. and 150° F., methyl alcohol, ethyl alcohol, n-propyl alcohol, iso-propyl alcohol, iso-butyl alcohol, n-butyl alcohol, sec.-butyl alcohol, furfural alcohol and mixtures thereof and xylene plus a primary alcohol. Preferred rinsing agents include xylene plus isopropyl alcohol, xylene plus furfural alcohol, and xylene plus n-butyl alcohol. The most preferred rinsing agents are xylene and n-butyl alcohol.

The present rheological agent and vehicle are generally prepared and utilized to clean a paint system as follows. The desired amount of the rheological material is added to the carrier or vehicle and agitated to form a uniform dispersion. The mixture is then heated to a desired temperature capable of dissolving the rheological material. After the rheological material is dissolved, the heated mixture is then cooled whereupon the rheological material is suspended as a gel in the vehicle. This suspended gel is added to the paint system, which is to be cleaned, at the common central supply depot. The mixture is passed through the system's tanks, valves, pumps, bypass lines, spray nozzles and the like to remove the encrusted paint. Also, the mixture may be sprayed onto the booth exterior surface to clean the same. After the entire amount of the mixture has been passed through the system and evacuated therefrom, cleaning the system, a solvent rinse is passed through the system. The solvent rinse will dissolve any straggling rheological material and vehicle to insure a cleaned system. Likewise, the solvent rinse is compatible with the paint so that the paint will not be effected upon start-up of the system. Alternatively, the solvent rinse may be heated through the use of heat exchangers to dissolve any remaining rheological material.

EXAMPLE 1

A composition comprising approximately 97% SC #150, an aromatic solvent with a 150° F. flash point, available from CHEMCENTRAL Corporation, Chicago, Ill., and 3% Viscotrol C, a rheological additive which is a derivative of castor oil, available from Mooney Chemicals, Inc., in Cleveland, Ohio was prepared by the following. The SC #150 was heated to 125° F. The Viscotrol C was added to the SC #150 and dissolved therein. The mixture was then cooled with agitation to room temperature whereupon the Viscotrol C became suspended as a particulate gel in the SC #150. The mixture was then added to cabernet Hi Solids paint encrusted inside a paint line system to be cleaned. The cabernet Hi Solids paint, available from PPG Industries, Pittsburgh, Pa., is used in paint line systems. The particulate gel and vehicle were passed through the paint line system and the coagulated paint collected. The paint line system was then rinsed by a mixture of 50% xylene and 50% n-butanol by volume, providing a cleaned internal surface.

EXAMPLE 2

The composition and process in Example 1 except that the paint line system was rinsed with SC #150 heated to 125° F., providing a cleaned internal surface.

EXAMPLE 3

A composition comprising approximately 95% SC #150, 5% Polyox Resin N-10, a rheological additive which is a derivative of ethylene oxide, available from Union Carbide Chemicals and Plastics Co., Inc. in Danbury, Conn., was prepared by the following. The SC #150 was heated to 140° F. The Polyox Resin N-10 was added to the SC #150 and dissolved therein. The mixture was then cooled with agitation to room temperature whereupon the Polyox Resin N-10 became suspended as a particulate gel in the SC #150. The mixture was then added to cabernet Hi Solids paint encrusted inside a paint line system to be cleaned. The particulate gel and vehicle were passed through the paint line system and the coagulated paint collected. The paint line system was then rinsed by a mixture of 50% xylene and 50% iso-propanol by volume, providing a cleaned internal surface.

EXAMPLE 4

The composition and process in Example 1, except that the paint line system was rinsed with SC #150 heated to 140° F. providing a cleaned internal surface.

EXAMPLE 5

A composition comprising approximately 95% Dipropylene Glycol Methyl Ether (Dowanol DPM) available from the Dow Chemical Company in Midland, Mich., and approximately 5% Methocel Cellulose Ether, type 4 FM PRG, a rheological additive which is a derivative of cellulose, available from the Dow Chemical Company in Midland, Mich., was prepared by the following. The Dowanol DPM was heated to 300° F. The Methocel was added to the Dowanol DPM and dissolved therein. The mixture was then cooled with agitation to room temperature whereupon the Methocel became suspended as a particulate gel in the Dowanol DPM. The mixture was then added to cabernet Hi Solids paint encrusted inside a paint line system to be cleaned. The particulate gel and vehicle were passed through the paint line system and the coagulated paint collected. The paint line system was then rinsed with furfuryl alcohol, providing a cleaned internal surface.

What is claimed is:

1. A cleaning composition for removing deposits from internal and external surfaces of a paint delivery system consisting essentially of:
   an effective amount from about 0.1% by weight to about 20.0% by weight of a non abrasive organic rheological material; and from about 80.0% to about 99.9% by weight of an organic aromatic or aliphatic solvent vehicle selected from the group consisting of aliphatic and aromatic hydrocarbons, lactones, esters, ketones, alcohols and glycol ethers, said organic rheological material forming an insoluble gel structure in said solvent vehicle for removing deposits from the paint delivery system, said insoluble particulate gel structure adapted to coagulate, remove and suspend encrusted paint deposits, said insoluble particulate gel structure adapted to be resolubilized by a rinsing agent, said organic rheological material being selected from the group consisting of cross-linked and converted starches and dextrins, methyl cellulose, hydroxypropyl methyl-cellulose, hydroxyethyl cellulose, carboxymethyl-cellulose, ethylene oxide polymers, an derivative of castor oil, and combinations thereof.

2. The cleaning composition of claim 1, wherein said cleaning composition comprises by weight:
   93.0 to 99.5% solvent vehicle; and
   00.5 to 7.0% organic rheological material.

3. The cleaning composition of claim 1, wherein said cleaning composition comprises by weight:
   96.0 to 99.0% solvent vehicle; and
   1.0 to 4.0% organic rheological material.

4. The cleaning composition of claim 1, wherein said rheological material forms particles with a size of less than 200 microns.

* * * * *